US008892767B1

(12) United States Patent
Yi et al.

(10) Patent No.: US 8,892,767 B1
(45) Date of Patent: Nov. 18, 2014

(54) METHOD AND APPARATUS FOR COMMUNICATION OF A TARGET OVER POINT-TO-POINT INTERFACE WITH A HOST MANAGING WIRELESS LAN SERVICES AND TARGET RESOURCES

(75) Inventors: Seung Baek Yi, La Jolla, CA (US); Mats Aretun, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1092 days.

(21) Appl. No.: 12/238,358

(22) Filed: Sep. 25, 2008

Related U.S. Application Data (60) Provisional application No. 60/975,511, filed on Sep. 26, 2007, provisional application No. 60/975,512, filed on Sep. 26, 2007.

(51) Int. Cl.
*G06F 15/16* (2006.01)
(52) U.S. Cl.
USPC .......................................................... 709/237
(58) Field of Classification Search
USPC ........................... 709/237, 217, 227, 230, 223
See application file for complete search history.

(56) References Cited

U.S. PATENT DOCUMENTS

| 2004/0131078 A1* | 7/2004 | Gupta et al. ................... 370/466 |
| 2007/0157027 A1* | 7/2007 | Palekar et al. ................. 713/171 |
| 2007/0204089 A1* | 8/2007 | Proctor .......................... 710/301 |
| 2007/0206570 A1* | 9/2007 | Gernert et al. ................. 370/352 |
| 2008/0069032 A1* | 3/2008 | Liu ................................ 370/328 |
| 2008/0195796 A1* | 8/2008 | Wang et al. .................... 711/102 |
| 2010/0157868 A1* | 6/2010 | Yam .............................. 370/311 |

* cited by examiner

*Primary Examiner* — Lan-Dai T Truong
(74) *Attorney, Agent, or Firm* — Holland & Hart LLP (57) ABSTRACT

This discloses a host system and a target configured to communicate via a point-to-point coupling a Host Target Communication (HTC) protocol for sharing the host system's wireless interface using endpoints to optimize messaging and with the host system managing the buffer resources of the target to minimize target requirements, latency and so on. The HTC integrates into a large number of point-to-point communications protocols. The program systems for the host and the target, installation packages, computer readable memories including program systems and/or installation packages, and a download server are also disclosed.

17 Claims, 9 Drawing Sheets

METHOD AND APPARATUS FOR COMMUNICATION OF A TARGET OVER POINT-TO-POINT INTERFACE WITH A HOST MANAGING WIRELESS LAN SERVICES AND TARGET RESOURCES

CROSS REFERENCE TO RELATED PATENT APPLICATIONS

This patent application claims priority for two provisional patent applications 60/975,511, and 60/975,512 both filed Sep. 26, 2007, which are incorporated herein in their entirety.

TECHNICAL FIELD

This invention relates to the communication of state information for a target over a point-to-point interface with a host where wireless Local Area Network (LAN) services are supported by the host.

BACKGROUND OF THE INVENTION

Today, communication frequently involves the use of Wireless Local Area Networks (WLANs), which require radio transceivers, antennas, encoders, decoders, message processing and network manager components. These resources can, to some extent, be shared, but currently, there are difficulties optimizing the configuration of message buffers to optimize overall system performance, in particular, system throughput. What is needed are methods and apparatus that improve system throughput by improved message buffer management and the organization of communication resources.

SUMMARY OF THE INVENTION

The ability to communicate across a wireless LAN comes at a systems cost. Not only must there be a transmitter and receiver, known herein as a transceiver, but there is also a need for an encoder and a decoder, message parser, local protocol manager and a message packer. And often, there is a need for some sort of antenna. Sharing these required resources reduces overall overhead. The entity by which these resources are to be shared will be referred to as a host. The entities that communicate with the host in sharing these resources will be referred to as targets.

This invention relates to methods and apparatus by which at least one target communicates via a point-to-point coupling with a host providing wireless LAN services and managing the target's communication resources accessing that the services of the WLAN. This method of communication will be referred to as a Host Target Communication (HTC) protocol. The HTC protocol will preferably integrate into a communications protocol of the point-to-point coupling between a host system with wireless resources and a target point-to-point coupled to the host for sharing the wireless resources with the host system managing the target's buffer resources involved in the WLAN communications. These target buffers will be referred to by a count of available buffers for a wireless network service called the credit information for that service. Wireless network communication to and from the target may be organized by endpoints. A target may receive many endpoints. Various services are assigned port identifications that are shared by the target and the host system through the HTC protocol, simplifying messaging through a physical link for each endpoint.

The messaging protocol into which the HTC is integrated may include a version of a Wireless Module Interface (WMI) protocol. The WMI is a host-target protocol for abstracting WLAN services across a communications pipe formed of the point-to-point communications between the target and host systems.

Point-to-point communications capable of supporting the HTC protocol may be compatible with any of a number of communications protocols. The communications protocols may be a serial packet based communication protocol, which may include a version of at least one of the following: interne related protocols such as Transmission Control Protocol (TCP) and Internet Protocol (IP), a Universal Serial Bus (USB), an IEEE 1394 (Firewire), a Secure Digital I/O (SDIO), a MemoryStick® I/O (MSIO), and so on. Alternatively, another packet based protocol, such as a Serial Peripheral Interface (SPI) may be used, even though SPI is a byte oriented protocol (in contrast to a serial packet based protocol).

A HTC protocol implementation may further optimize system performance on the target by consolidating multiple endpoints into a single endpoint, from which the target HTC distributes messages to and from various target WLAN services, with the host manager of the HTC performing a similar function on the host system. This preferably leads to the target HTC and the host manager including an endpoint multiplixeor/demultiplexor distributing messages to the various WLAN services in the target or the host messaging environment, respectively. Each of these services is represented as a port of the endpoint. Each service provides at least one usually bidirectional point-to-point link. The links are preferably multiplexed through a physical transport, for example the SDIO-MBOX or the SPI-MBOX.

As used herein, a service will refer to a destination for a communication path on the target. Typically, one service common to most implementations is a command/control service. It may be preferred that there are one or more data services, possibly including a preferred representation of the four Wireless Multi-Media (WMM) hardware queues and/or ad hoc communication services.

As used herein, an endpoint will refer to a connection path between the host and the target messaging system, which may preferably delineate a service.

An endpoint identifier may be a handle for a connection and/or may be used to identify the connection. The endpoint identifier may be represented as a byte to support identifying up to 255 connections. The endpoint identifier value 0 may preferably be reserved for the HTC setup service.

A service identifier is an identifier associated with a wireless service. Again, assuming the preferred byte representation, this allows up to 255 services to be identified.

The HTC protocol defines a HTC packet or frame as including a HTC header and a HTC payload, which may have zero length. The HTC packet may optionally include a HTC trailer. The HTC header may preferably include an endpoint identifier, at least one control-option field and a packet length. The control-option fields may further include a flag field and at least one and preferably two control fields. The endpoint identifier, flag field, and control fields may preferably all be byte fields. The packet length may be at least one byte and preferably at least two bytes.

The optional HTC trailer may vary in length and include state information such as credit and/or look-ahead length records, which may be any combination of fixed length and variable length records. As used herein, a credit may represent a message buffer in the target messaging environment. The invention uses the host messaging environment to manage the credits and direct the target to release credits and the associated buffers when new messages require this.

Host to target payloads may preferably include a connect to a service command (sent to endpoint 0), a HTC setup complete command (sent to endpoint 0), and a HTC frame header command indicating that a WMI data and/or control packet will be transmitted with the payload of the following header. Target to host payloads may preferably include a target ready to communicate with HTC command response (sent to endpoint 0), a response to connect to a service request (sent to endpoint 0), a received data packet or control response packet with payload following header.

HTC messages with no payload or options may preferably be used for message flow control management. Such messages will be referred to as HTC null frames.

HTC records are preferably used to provide flow control and/or look-ahead information. In some implementations, records are preferably issued from the target to the host. Typically, records arrive in the receive data packets or in a HTC null frame. The received packet response are considered opportunistic while the HTC null frames sent to endpoint 0 are deterministic, being triggered based upon the target messaging system state. Preferably, there are at least three record types defined: a null HTC record used to pad out the trailer if needed, a credit record for HTC that is frequently a variable length record carrying flow control information, and a HTC look-ahead record containing at least the packet length from the header of the next packet.

Opportunistic received packet responses may be preferred in implementations where the point-to-point communications protocol is internet related, for example TCP/IP, with its acknowledgements and handshakes, or for example with Secure Digital IO (SDIO) with its minimum packet length of 128 byte, with roughly 60 bytes required for acknowledgements. Thus, the HTC trailer may be employed to pad the packet length of HTC packet to a minimum packet size required by particular requirements of the point-to-point coupling. The HTC trailer may opportunistically include the credit report and/or the look-ahead record. These opportunistic packet responses may be preferred, in that the host messaging environment does not need to inquire for credit reports or whether the target messaging environment has more packets to send, which advantageously lowers the bandwidth overhead across the point-to-point coupling.

DETAILED DESCRIPTION

The ability to communicate across a Wireless LAN (WLAN) comes at a systems cost. Not only must there be a transmitter and receiver, known herein as a transceiver, but there is also a need for an encoder and a decoder, message parser, local protocol manager and a message packer. And often, there is a need for some sort of antenna. Sharing these required resources may reduce overhead. The entity by which these resources are to be shared will be referred to as a host 20. The entities that communicate with the host in sharing these resources will be referred to as targets 10.

The inventors observed that more straightforward, earlier approaches to achieving these goals had some unneeded overhead that this invention seeks to address. First, setup time and transaction latency for serial protocols such as Secure Digital IO (SDIO) or Serial Peripheral Interface (SPI) impacted overall system performance. Second, systems overhead was high when there was a mix of input-output operations to determine status, execute buffer management, and receive data packets. Third, the block transfers created a lot of unused data padding that the inventors realized could be used for channel management.

This invention relates to methods and apparatus by which at least one target 10 communicates via a point-to-point coupling 4 with a host system 20 providing wireless LAN services and managing the target's communication resources accessing the services of the WLAN. This method of communication will be referred to as a Host Target Communication (HTC) protocol. The HTC protocol will preferably integrate into a communications protocol of the point-to-point coupling between a host system with wireless resources and a target point-to-point coupled to the host for sharing the wireless resources with the host system managing the target's buffer resources involved in the WLAN communications. These target buffers will be referred to by a count of available buffers for a wireless network service called a credit information for that service. Wireless network communication to and from the target is organized by endpoints with one endpoint per target. Various services are assigned port identifications that are shared by the target and the host system through the HTC protocol, simplifying messaging through a physical link for each endpoint.

Figure 1:
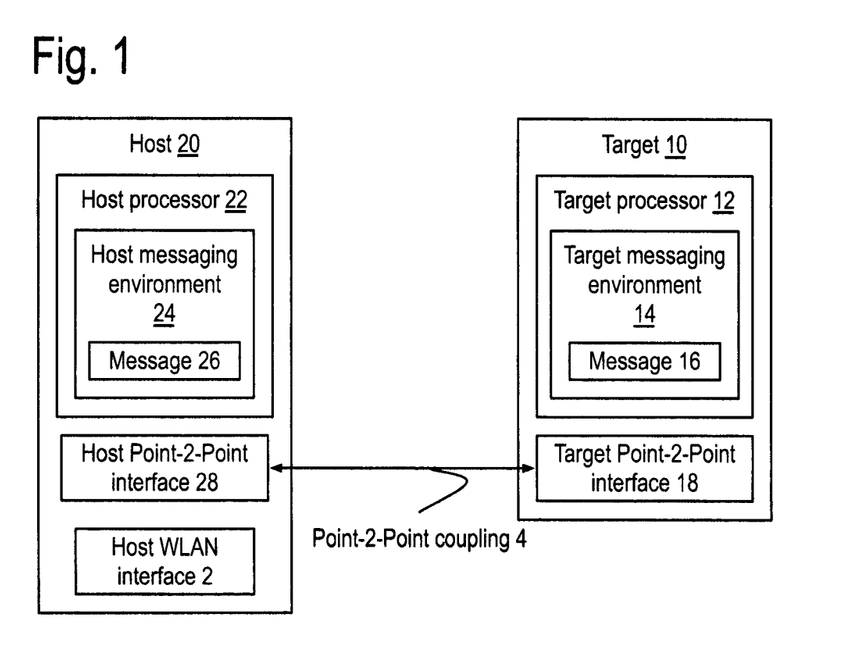
FIG. 1 shows a simplified block diagram of a target point-to-point coupled to a host system, each including at least one processor and a point-to-point interface. The host system further includes a Wireless LAN (WLAN) interface. Each processor includes a messaging environment for creating and/or processing at least one message based upon a Host Target Communications (HTC) protocol integrated into a point-to-point communications protocol used between the host system and the target.

Referring now to the drawings more particularly by reference numbers, FIG. 1 shows a simplified block diagram of a target 10 point-to-point coupled 4 to a host system 20, each including at least one processor and a point-to-point interface. The target integrated circuit includes a target processor 12 and a target point-to-point interface 18 used by a target messaging environment 14 to send and receive messages 16. The host system includes a host processor 22 and a host point-to-point interface 28 used by a host messaging environment 24 to send and receive messages 26. The host system further includes a Wireless LAN (WLAN) interface 2 that is also used by the host messaging environment to send and receive messages. The host processor operates the host messaging environment and the target processor operates the target messaging environment. A Host-Target Communications (HTC) protocol will be defined herein, integrated into the communications protocol of the point-to-point coupling, for sharing the wireless resources of the host system, with the host system managing the target's buffer resources involved in the WLAN communications.

Figure 2:
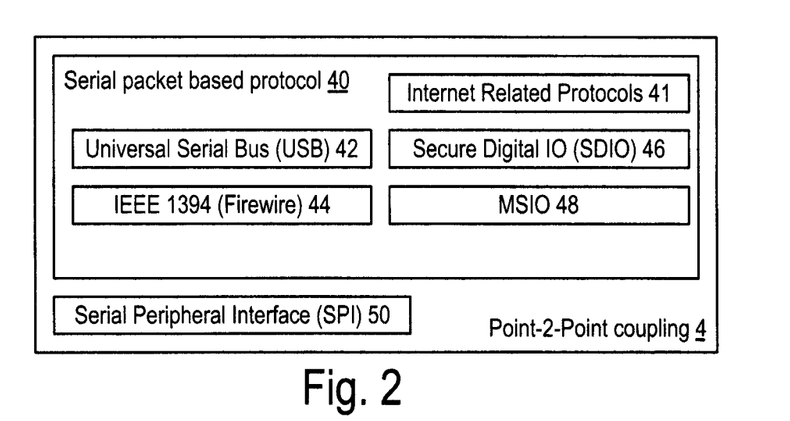
FIG. 2 shows some examples of point-to-point communication protocols into which the HTC communications protocol may be integrated.

FIG. 2 shows some examples of point-to-point communication protocols into which the HTC communications protocol may be integrated. Examples of the point-to-point couplings 4 of FIG. 1 may be compatible with any of a number of communications protocols capable of supporting the HTC protocol. For many embodiments of the invention, the communications protocols may be a serial packet based communication protocol 40, which may include a version of at least one of the following: an interne related protocols 41 (i.e, Transmission Control Protocol (TCP) and Internet Protocol (IP) not shown), a Universal Serial Bus (USB) 42, an IEEE 1394 (Firewire) 44, a Secure Digital I/O (SDIO) 46, a MemoryStick® I/O (MSIO) 48, and so on. Alternatively, another packet based protocol, such as Serial Peripheral Interface (SPI) 50 may be used, even though SPI is a byte oriented protocol (in contrast to a serial packet based protocol).

These target buffers will be referred to by a count of available buffers for a wireless network service called the credit information for that service. Wireless network communication to and from the target 10 will be organized by endpoints with at least one endpoint per target. Various services are assigned port identifications that are shared by the target and the host system 20 through the HTC protocol, simplifying messaging to a physical link for each endpoint.

Figure 3:
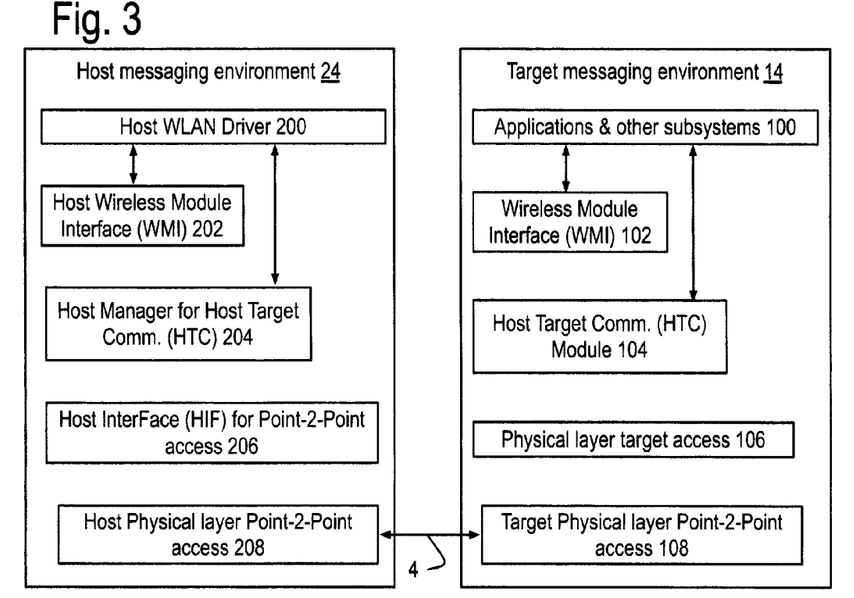
FIGS. 3 and 4 show layer diagrams of some preferred details of the host messaging environment interacting with the target messaging environment. The host messaging environment uses a host WLAN driver, a Wireless Module Interface (WMI) and a host manager for the HTC protocol. These Figures also provide details of the target messaging environment including the HTC module with another WMI, a HTC module, and endpoints for wireless services that may preferably include a WMI control service and four commonly used data services for best effort, background, video and voice communications.
Figure 4:
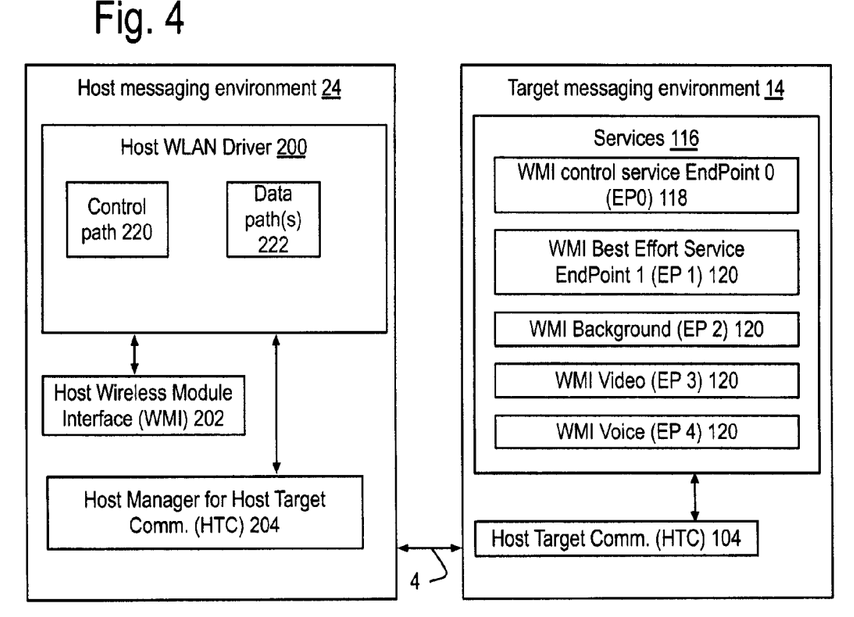

The HTC protocol implementation may further optimize system performance on the target 10 by consolidating multiple endpoints into a single endpoint, from which a target HTC 104 distributes messages to and from various target WLAN services, with a host manager 204 of the HTC performing a similar function on the host system 20 as will be shown in FIGS. 3 and 4. This preferably leads to the target HTC 104 and the host manager 204 each including an endpoint multiplixeor/demultiplexor distributing messages to the various WLAN services in the target or the host messaging environment, respectively. Each of these services is represented as a port of the endpoint. Each service provides at least one usually bidirectional point-to-point link. The links are preferably multiplexed through a physical transport, for example the SDIO-MBOX or the SPI-MBOX.

FIGS. 3 and 4 show layer diagrams of some preferred details of the host messaging environment 24 interacting with the target messaging environment 14. The host messaging environment 24 may preferably include a host WLAN driver 200, a Wireless Module Interface (WMI) 202 and a host manager 204 for the HTC protocol. The target messaging environment may preferably include a HTC module 104 with another WMI 102, and endpoints for wireless services that may preferably include a WMI control service 118 and four commonly used data services 120 for best effort, background, video and voice communications.

FIG. 3 shows some details of the target messaging environment 14 and the host messaging environment 24 of FIG. 1 as a simplified communications layer diagram showing the host messaging environment 24 including a host manager 204 for the Host Target Communications (HTC) and the target messaging environment 14 including the HTC module 104.

The host messaging environment 24 into which the Host Manager 204 for the HTC is integrated may include a version of a Host Wireless Module Interface (WMI) 202 for the WMI protocol. The WMI protocol is a host-target protocol for abstracting WLAN services across a communications pipe formed of the point-to-point communications 4 between the target 10 and the host system 20.

This invention relates to methods and apparatus by which at least one target 10 communicates credit information via a point-to-point communication channel 4 with a host 20 providing wireless LAN services through a WLAN interface 2. The credit information refers to message buffer resource counts in the target messaging environment 14. This method of communication is referred to herein as a Host Target Communication (HTC) protocol.

As used herein, an endpoint will refer to a connection path between the host messaging environment 24 and the target messaging environment 14, which may preferably delineate a service.

An endpoint identifier may be a handle for a connection and/or may be used to identify the connection. The endpoint identifier may be represented as a byte to support identifying up to 255 connections. The endpoint identifier value 0 may preferably be reserved for the HTC setup and control service.

As used herein, a service will refer to a destination for a communication path on the target 10. Typically, one service common to most implementations is a Wireless Module Interface (WMI) command/control service 118 that may preferably be designated EndPoint 0 (EP 0) as shown in FIG. 4. It may be preferred that there are one or more data services 120, possibly including a preferred representation of four Wireless Multi-Media (WMM) hardware queues. By way of example, the WMI Best Effort Service may be EndPoint 1 (EP 1) data service. The WMI Background service may be EndPoint 2 (EP 2). The WMI Video service may be EndPoint 3 (EP 3). And the WMI Voice service may be EndPoint 4 (EP 4). In some embodiments, ad hoc data services may be next designated, with preferably at least up to 16 such services being supported. In certain embodiments, the priority of the services may be determined by the ordering of the endpoint numbers, the smaller the endpoint number, the higher the service's priority.

A service identifier is an identifier associated with a service associated with the target 10. Again, assuming the preferred byte representation, this allows up to 255 services to be identified.

The HTC protocol implementation further optimize system performance on the target 10 by consolidating multiple endpoints into a single endpoint, from which the target HTC 104 distributes messages to and from various WLAN services 116, with the host manager 204 of the HTC performing a similar function on the host system 20, as shown by example in FIG. 4.

Figure 5:
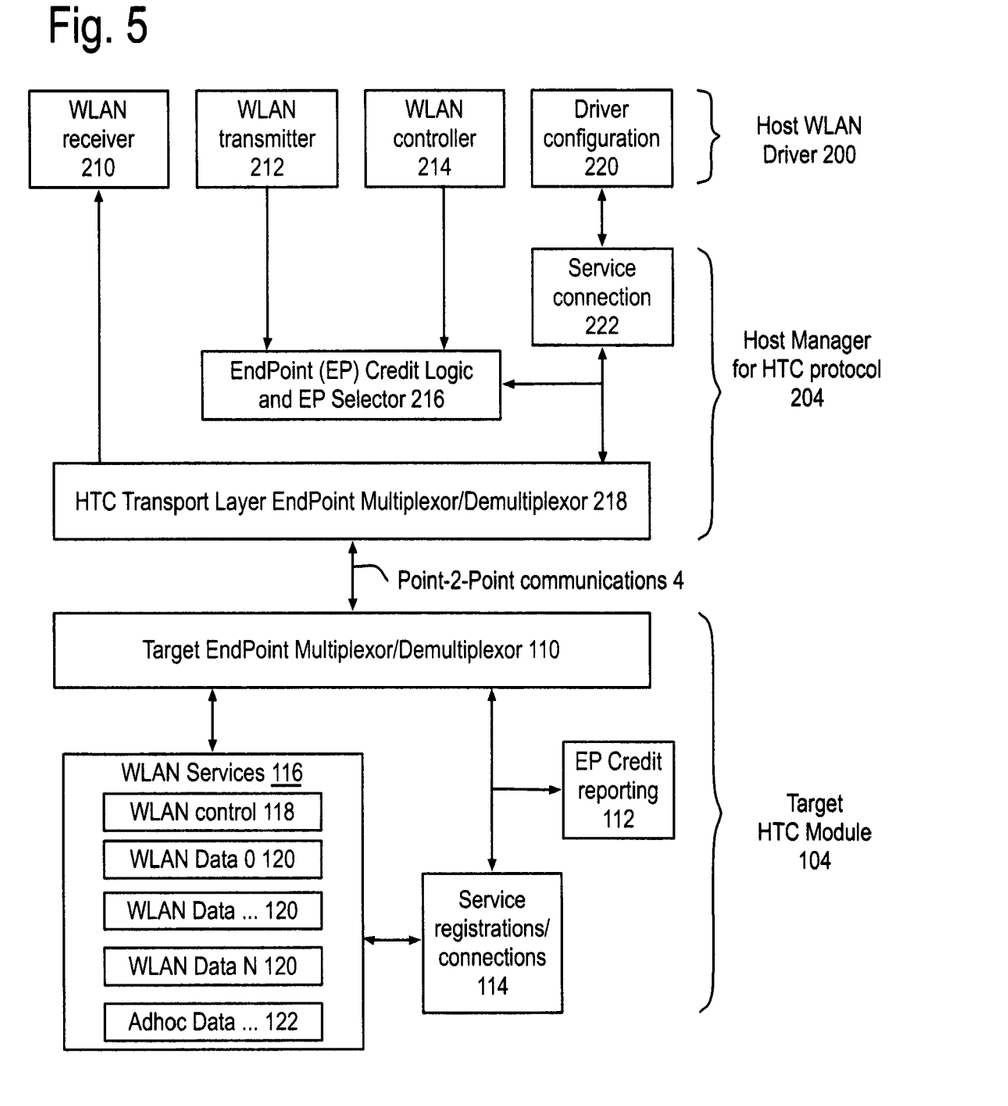
FIG. 5 shows some further details for the host messaging environment and the target HTC module showing both including endpoint multiplexor-demultiplexors supporting a physical link for the various services using the endpoints. Such embodiments of the invention provide improved overhead and processing efficiency.

In greater detail, FIGS. 4 and 5 show simplified resource diagrams of some of the details of the host messaging environment for the HTC protocol accessing services of the Host WLAN driver 200 and interacting through the point-to-point communications 4 with the HTC 104 in the target messaging environment 14 of FIG. 3. The host WLAN driver may preferably include access to a WLAN receiver 210, access to a WLAN transmitter 212, access to a WLAN controller 214 and a driver configuration mechanism 220. The host manager for the HTC protocol may preferably include an HTC transport layer EndPoint (EP) multiplexor-demultiplexor 218, an EP credit logic and EP selector 216 and at least one service connection module 222. The target HTC module 104 may preferably include a target endpoint multiplexor/demultiplexor 110, an endpoint credit reporting module 112, a module for service registrations/connections 114 and a collection of Wireless LAN services 116. The WLAN services may preferably include a WLAN control service 118 and at least one WLAN data service 120 and/or at least one adhoc data service 122.

Figure 6:
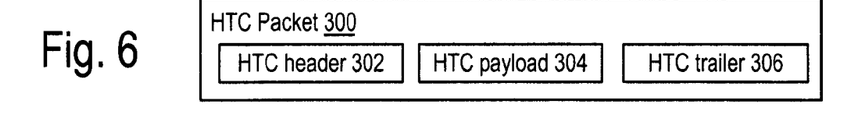
FIGS. 6 to 17 show various levels of the HTC protocol in terms of the HTC packet components, with the basic components being shown in FIGS. 6 to 9, payloads from the host system to the target in FIG. 10, payloads from the target to the host system in FIG. 11, HTC null frames shown in FIG. 12 and the record types of the trailer shown in FIGS. 13 to 17.
Figure 7:
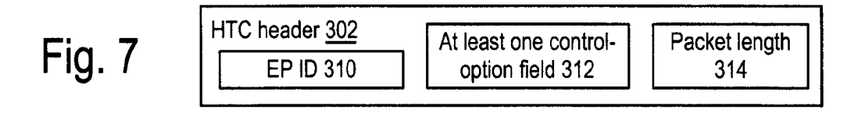
Figure 8:
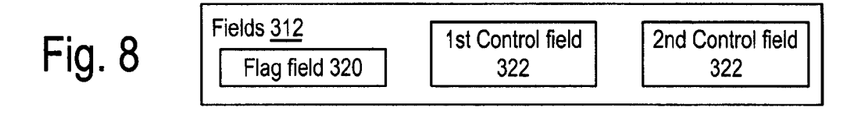

The HTC protocol defines a HTC packet 300 or frame as shown in FIG. 6 including a HTC header 302 and a HTC payload 304, which may have zero length. The HTC packet 300 may optionally include a HTC trailer 306. FIG. 7 shows the HTC header 302 may preferably include an endpoint identifier 310, at least one control-option field 312 and a packet length 314. FIG. 8 shows the control-option fields 312 may further include a flag field 320 and at least one and preferably two control fields 322. The endpoint identifier 310, flag field 320, and control fields 322 may preferably all be byte fields. The packet length 314 may be at least one byte and preferably at least two bytes.

Figure 9:
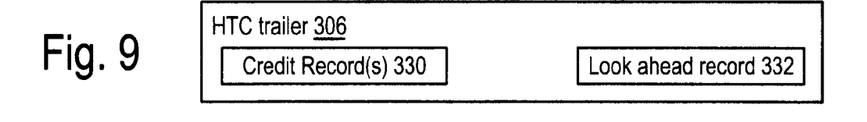

FIG. 9 shows the optional HTC trailer 306 of FIG. 6 may vary in length and include credit records 330 and/or look-ahead record 332. The credit records 330 may be variable length records. The look-ahead records 332 are typically fixed length records.

Figure 10:
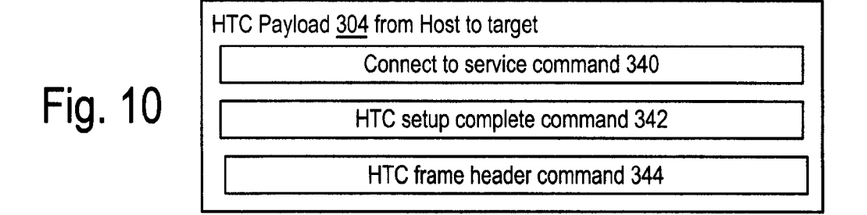

FIG. 10 shows some examples of host 20 to target 10 payloads 304 that may preferably include a connect to a service command 340 (preferably sent to endpoint 0), a HTC setup complete command 342 (preferably sent to endpoint 0), and a HTC frame header command 344 indicating that a WMI data and/or control packet will be transmitted with the payload of the following header.

Figure 11:
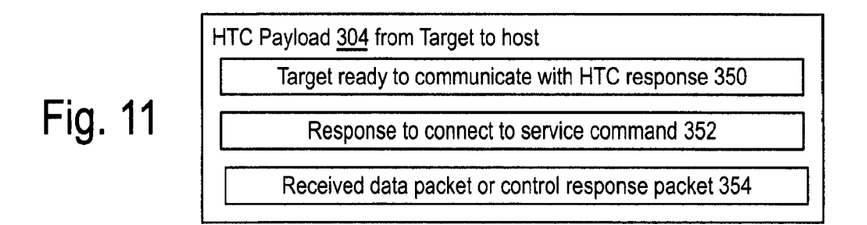

FIG. 11 shows some examples of target 10 to host 20 payloads 304 may preferably include a target ready to communicate with HTC command response 350 (preferably sent to endpoint 0), a response to connect to a service command 352 (preferably sent to endpoint 0), and a received data packet or control response packet 354 with payload following header.

Figure 12:
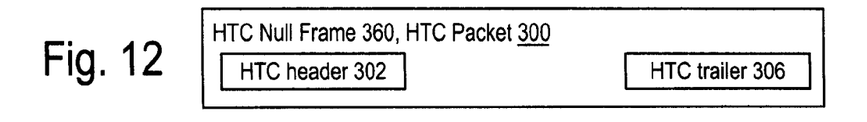

FIG. 12 shows a HTC null frame 360 as a HTC packet 300 with no payload or options that may preferably be used for passing state information such as information regarding message flow control management.

Figure 13:
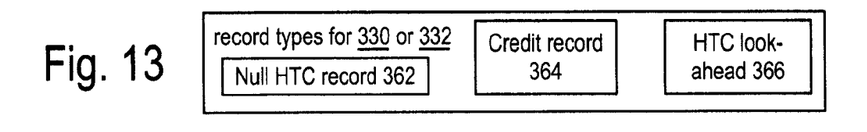

FIG. 13 shows some examples of the HTC records that are preferably used to provide state information such as credit records 330 and/or look-ahead records 332. Preferably at least three record types defined: a null HTC record 362 used to pad out the HTC trailer 306 if needed, a credit record 364 for HTC that is frequently a variable length record carrying flow control information, and a HTC look-ahead record 366 containing at least part of the HTC header 302 of the next HTC packet 300, preferably with the next packet length 314.

In some implementations, these records are preferably issued from the target 10 to the host 20. Typically, the records arrive in the packets 300 with received data or control 354 or in a HTC null frame 360. The received packet responses are considered opportunistic while the HTC null frames sent to endpoint 0 are demanded, being triggered based upon the target messaging system state. Examples of a preferred opportunistic response may include, but are not limited to, response packets acknowledging and/or providing other handshaking for TCP/IP, or acknowledgements for SDIO, which has a minimum packet size of 128 bytes, of which the acknowledgement may often take up about sixty bytes. Thus, trailer 306 may be employed to pad the packet length of HTC packet 300 to a minimum packet size required by particular requirements of the point-to-point coupling 4. The trailer 306 may opportunistically include the credit report 330 and/or the look-ahead record 332. These opportunistic responses may be preferred, in that the host messaging environment 24 does not need to inquire for credit reports or whether the target messaging environment 14 has more packets to send, which advantageously lowers the bandwidth overhead across the point-to-point coupling 4.

Figure 14:
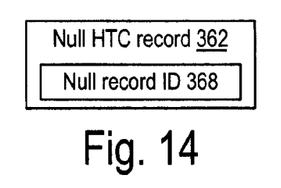

FIG. 14 shows an example of a null HTC record 362 of FIG. 13 consisting of a null record identifier 368, which in some preferred implementations may be the value 0, possibly formatted as a byte.

Figure 15:
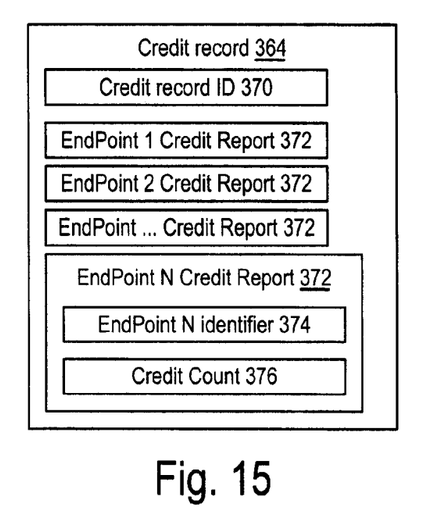

FIG. 15 shows an example of a credit record 364 of FIG. 13 including a credit record identifier 370, and a collection of credit reports 372 for the various registered endpoints. Each of these credit reports 372 may preferably include a credit count 376 and may further include an endpoint identifier 374. In certain implementations, the credit count 376 may be implicitly associated with the endpoint identifier 374 by its ordering in the credit record 364. In certain preferred implementations, the credit record identifier 370 may be the value 1, possibly formatted as a byte.

Figure 16:
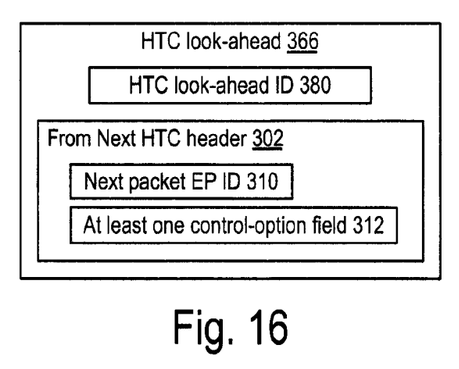
Figure 17:
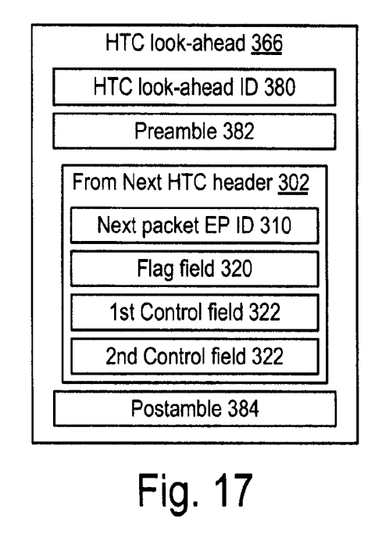

FIG. 16 shows an example of the HTC look-ahead record 366 of FIG. 13 including a HTC look-ahead identifier 380, and at least some components of the next HTC packet 300's HTC header 302, for example, the next packet endpoint identifier 310 and possibly at least one of the control-options fields 312. In certain preferred implementations, the HTC look-ahead identifier may have the value of 2, possibly formatted as a byte.

FIG. 16 shows a preferred refinement of the HTC look-ahead record 366 of FIG. 16, further including a preamble 382 and a postamble 384. The components from the next HTC packet 300's HTC header may further include the flag field 320 and/or the first control field 322 and/or the second control field 322.

Figure 18:
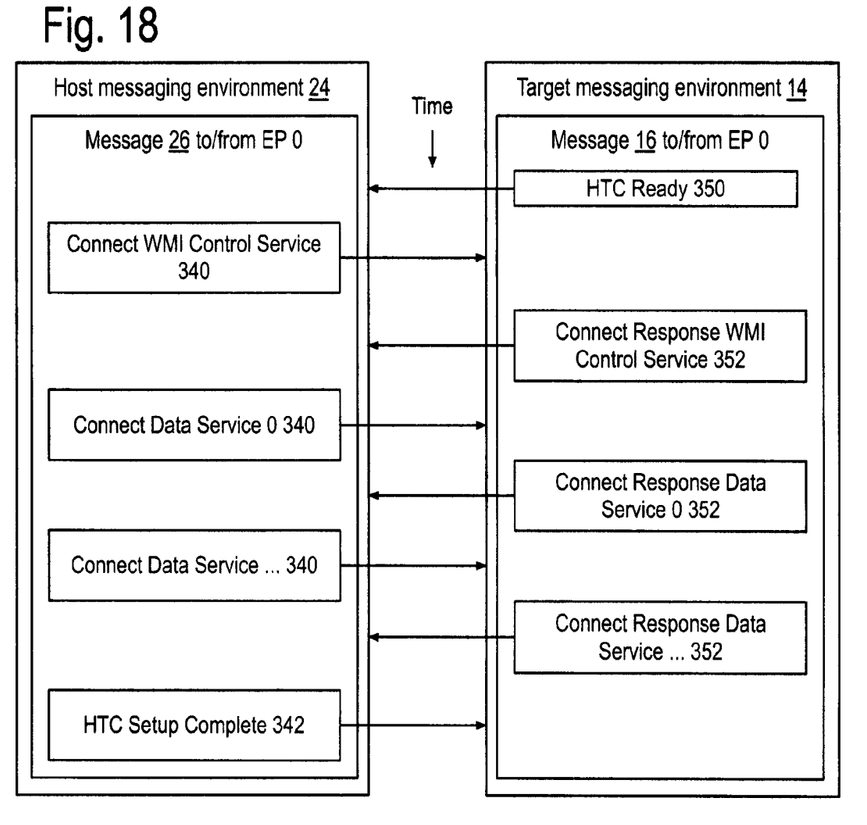
FIG. 18 shows the setting up of the target messaging environment for the HTC protocol in terms of a succession of packets transmitted over time, starting with the target informing the host system that it is ready to setup its messaging environment for the HTC protocol.

FIG. 18 shows the interactions through time between the host messaging environment 24 and the target messaging environment 14 to initialize the target messaging environment for the HTC protocol. All the messages are preferably to or from the endpoint 0. These messages are transmitted and received sequentially in time starting with the top message sent from the target and proceeding to the bottom message sent from the host. The target sends an HTC ready message with payload 350 as shown in FIG. 11. The host responds to receipt of this message by sending a message to connect the WMI control service with payload 340 as shown in FIG. 10. The target responds to the receipt of this message by sending the connect response message as a payload 352 when the WMI control service has been connected. The host responds to receipt of this message by sending a connect data service 0 message as payload 340. The target responds to receipt of this message by sending a connect response to data service 0 as payload 352 when data service 0 has been connected. This continues for as many services as the host commands to be connected. When the services are all connected, the host preferably sends a HTC setup complete message as payload 342, and the HTC protocol begins normal operations.

Figure 19:
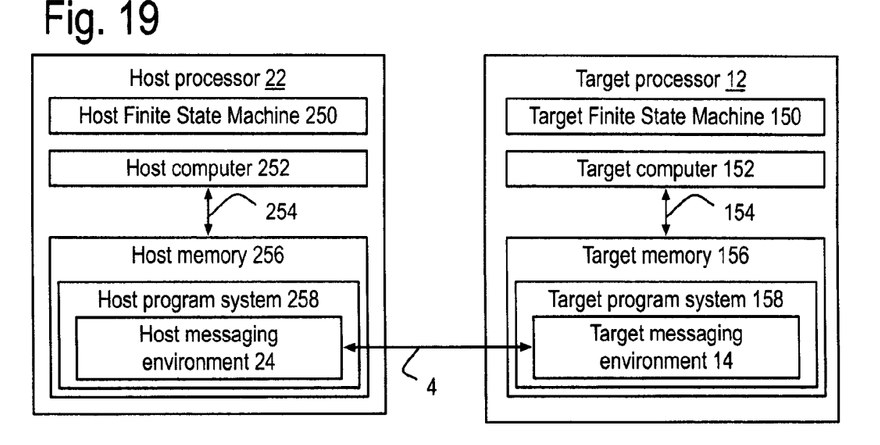
FIG. 19 shows some details of the host processor and/or the target processor of FIG. 1 as including at least one instance of a finite state machine and/or a computer accessibly coupled to a computer readable memory including a program system supporting the messaging system of its processor.

FIG. 19 shows an example of some implementation alternatives for the host processor 22 and/or for the target processor 12 of FIG. 1. The processors 12 and/or 22 may include at least one instance of a finite state machine and/or at least one instance of a computer. By way of example, the host processor may include an instance of the host finite state machine 250 and an instance of the host computer 252 accessibly coupled 254 to a host computer readable memory 256 including a host program system 258 that may at least partly instruct the host computer to implement the host messaging environment 24. Also by way of example, the target processor may include an instance of a target finite state machine 150 and a target computer 152 accessibly coupled 154 to a target computer readable memory 156 including a target program system 158 that may at least partly instruct the target computer to implement the target messaging system 14.

By way of example, the host finite state machine 250 and/or the target finite state machine 150 may implement queues and/or hardware counters for buffer credits and/or Direct Memory Access (DMA) interfaces to random access memory or disk drives. The host program system 258 and/or the target program system 158 may implement support for parsing the HTC protocol for the received HTC packets 300 and/or assemble the components of the HTC packets to be sent to an endpoint and/or provide the control services for WMI and/or provide support for the data services for WMI. The host program system may further support the host WLAN driver 200 as shown in FIG. 5.

As used herein, any computer includes at least one data processor and at least one instruction processor instructed by a program system, where each of the data processors is instructed by at least one of the instruction processors ant at least one of the data processors supports implementation of this invention by its processor. As used herein, a finite state machine receives at least one input, maintains and updates at least one state and generates at least one output based upon the value of at least one of the inputs and/or the value of at least one of the states.

Some of the following figures show flowcharts of at least one embodiment of the invention's methods, which may include arrows signifying a flow of control, and sometimes data, supporting various implementations. These may include a program operation, or program thread, executing upon the computer or states of a finite state machine. Each of these program steps may at least partly support the operation to be performed. The operation of starting a flowchart refers to entering a subroutine or a macro instruction sequence in the computer or of a possibly initial state or condition of the finite state machine. The operation of termination in a flowchart refers to completion of those operations, which may result in a subroutine return in the computer or possibly return the finite state machine to a previous condition or state. The operation of terminating a flowchart is denoted by a rounded box with the word "Exit" in it.

Figure 20:
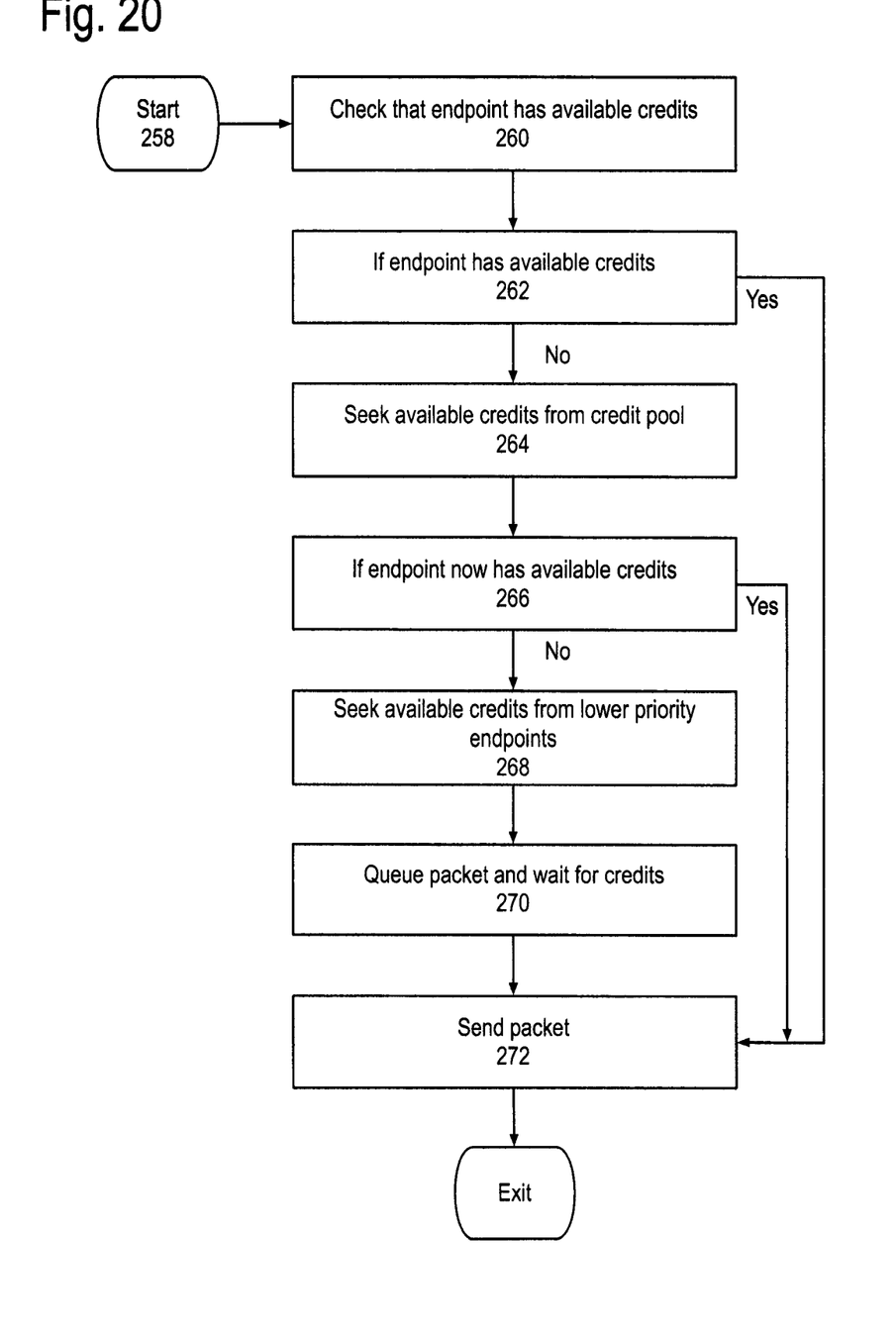
FIG. 20 shows a flowchart of the host program system of FIG. 19 showing the process steps involved in managing the credits of the target messaging environment for the HTC protocol. As used herein, the credits refer to the number of buffers available for a service to process packets in the target messaging system. By having the management responsibility focused in the host system, the firmware requirements, general system overhead and overall system latency of the target are optimized. The target is left with executing message processing with the credit resources (buffers) and with reporting which services have what credits available.

FIG. 20 shows a flowchart of an example implementation of the host program system 258 checking for available credits in the target messaging environment 14 by executing the following program steps: Program step 260 supports the host 20 checking that the endpoint of the next message has enough available credits for the message. Program step 262 checks if the endpoint has enough available credits, and if it does branches to program step 272 that supports sending the packet 300. If there are not enough credits available, then execute program step 264 to seek available credits from credit pool maintained in the host messaging environment 24. Program step 266 determines if the endpoint now has enough available credits, and if so, executes program step 272 as previously discussed. If there are not enough available credits in the credit pool, execute program step 268 to seek available credits from lower priority endpoints. When this has been done, program step 270 queues the packet and waits for the credits before executing program step 272 to send the packet.

Figure 21:
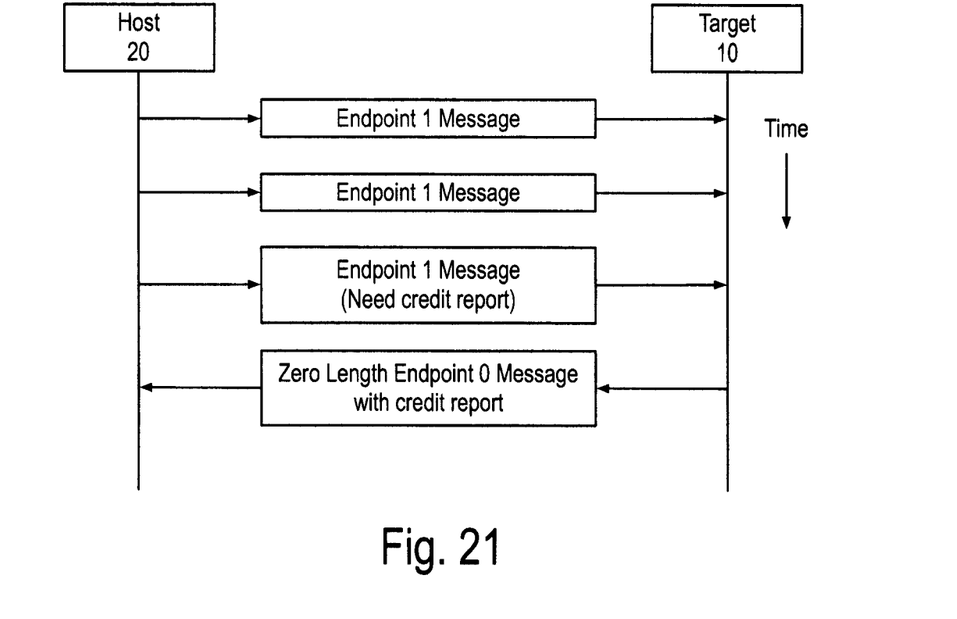
FIG. 21 shows an example of the messages of an HTC protocol implemented using a demand based response to a request from the host for a credit report. The demand based response may preferably be a HTC null payload packet to the control endpoint with the credit report included in the trailer.
Figure 22:
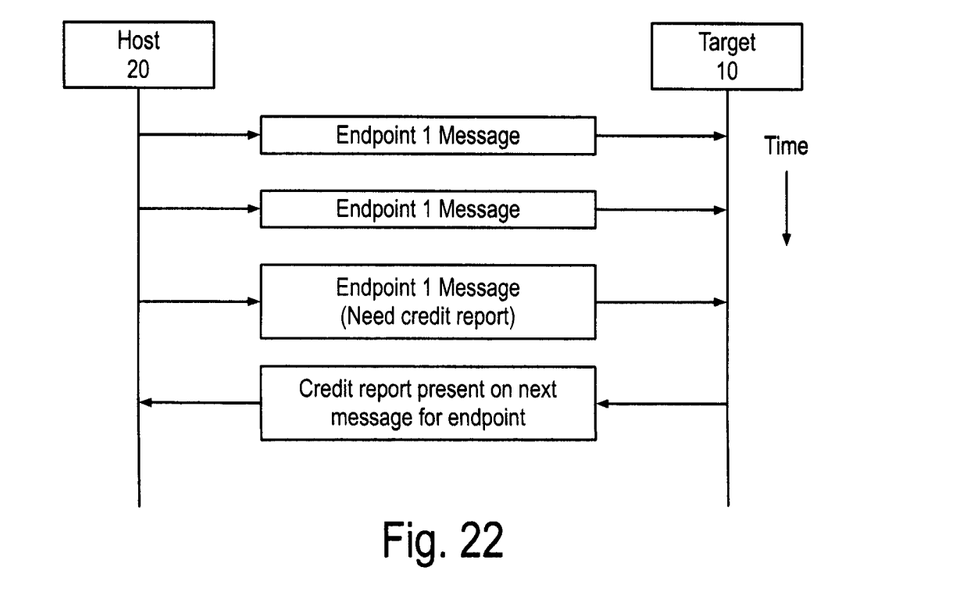
FIG. 22 shows an alternative example to FIG. 21 with the HTC protocol using a credit report present in the trailer on the next message for the endpoint, which is referred to herein as an opportunistic response.

FIG. 21 shows a demand based credit reporting scheme and FIG. 22 shows an opportunistic credit reporting scheme. In certain preferred embodiments, the host system 20 may send a succession of messages to an endpoint on the target 10, for example endpoint 1, which do not trigger credit reporting, followed by a message from the host indicating that the credit report is needed. In the most common, demand based situation, the target responds by sending a zero length payload message with the credit record 364 as shown in FIGS. 13 and 15. In some opportunistic situations, such as where the HTC protocol is integrated into a TCP and IP compatible protocol, the credit report is presented on the next message the endpoint.

Figure 23:
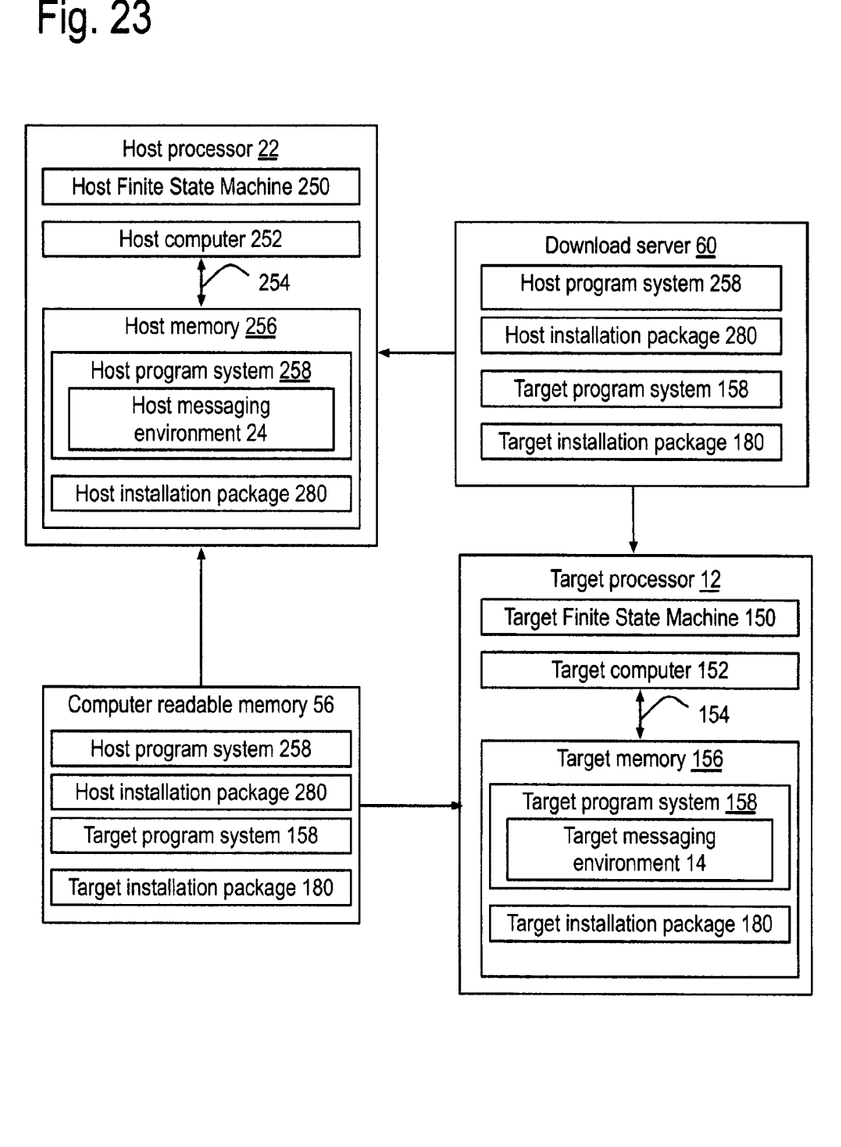
FIG. 23 shows a host installation package, a target installation package in support of the HTC protocol. The program systems and/or the installation packages may be included in a download server and/or a computer readable memory.

FIG. 23 shows a host installation package 280 in the host computer readable memory 256 that may preferably generate at least part of the host program system 258 supporting the host messaging environment 24 of the previous Figures in support of the HTC protocol. A target installation package 180 in the target computer readable memory 158 may preferably generate the target program system 158 supporting the target messaging environment 14 in support of the HTC protocol. The program systems 158 and/or 258 and/or the installation packages 180 and/or 280 may be included in a download server 60 and/or a computer readable memory 56. The download server or the computer readable memory may be sold to directly and/or indirectly provide revenue to someone. A single installation package may provide the host program system and the target program system, but has not been shown to simplify the Figure. The installation package 180 and/or 280 may include source text used to generate the program system 180 and/or 280 using the host system 20 and/or the target 10.

The host system 20 may include at least one of: a router, a wireless network server, a wireless base station, a desktop computer, a gaming computer, a notebook computer, a handheld computer, a wireless telephone, and/or a personal digital assistant.

The target 10 may include at least one of: a Universal Serial Bus (USB) device, a Firewire device, a disk drive, a removable memory device, a security identification device, a gaming device, a camera, a media player, and a headset.

The preceding embodiments provide examples of the invention, and are not meant to constrain the scope of the following claims.

What is claimed is:

1. A method, comprising the step of:

sending a packet from a target to a host system, with said packet including a data payload and a trailer, wherein said trailer pads a length of said packet to a predetermined length and said trailer includes state information, and wherein said target is point-to-point coupled with said host system using a point-to-point communications protocol;

wherein said state information includes at least one of a credit report of a messaging environment of said target, said credit report including an available buffer count for at least one service of a Wireless Module Interface (WMI), and a look-ahead record, said look-ahead record including at least a packet length of a next packet to be sent by said target to said host system;

wherein said point-to-point communications protocol comprises at least one member of the group consisting of a serial packet based protocol and another communications protocol when implemented with packet passing;

wherein said serial packet based protocol is a version of at least one member of the group consisting of at least one internet related protocol, a Universal Serial Bus (USB) protocol, a Secure Digital IO (SDIO) protocol, an Institute for Electronic and Electrical Engineers (IEEE) 1394 (Firewire) protocol and a MEMORYSTICK™ (MSIO) protocol; and wherein said another communications protocol is a version of a Serial Peripheral Interface (SPI) protocol.

2. The method of claim 1, wherein said packet, a previous packet and said next packet are compatible with a Host Target Communications (HTC) protocol.

3. The method of claim 1, wherein said packet implements at least one member of the group consisting of an acknowledgement of a previous packet, a handshake for said previous packet.

4. The method of claim 1, wherein said trailer includes said credit report and said look-ahead record.

5. A target apparatus, comprising:

a target point-to-point interface for communicating via a point-to-point coupling using a point-to-point communications protocol;

a target processor coupled to said target point-to-point interface; and memory in electronic communication with said target processor, the target apparatus lacking a Wireless Local Area Network (WLAN) interface, wherein a host system includes said WLAN interface and is configured to provide services of said WLAN interface by communicating via said point-to-point coupling with said target apparatus, wherein the memory stores instructions that when executed by said target processor cause said target processor to use said services of said WLAN interface by communicating via said point-to-point coupling with said host system, wherein the memory stores instructions that when executed by said target processor cause said target processor to support a target messaging environment for communicating with a host messaging environment supported by said host system, said host messaging environment providing a host manager for a Host Target Communications (HTC) protocol, said HTC protocol sharing a Wireless Module Interface (WMI) with said target apparatus for using said WLAN interface, said HTC protocol sharing services of said WMI by use of endpoints identifying said services, wherein said host manager manages at least two buffer resources on said target apparatus for said services, wherein said target messaging environment provides a module of said HTC protocol, said services of said WMI by use of said endpoints, and said buffer resources for said services as managed by said host manager.

6. The target apparatus of claim 5, wherein said point-to-point communications protocol comprises at least one member of the group consisting of a serial packet based protocol and another communications protocol when implemented with packet passing;

wherein said HTC protocol supports an HTC packet comprising a HTC header and a HTC payload;

wherein said HTC header comprises an identifier of said endpoints; and wherein said HTC payload has a length of at least zero.

7. The target apparatus of claim 6, wherein said serial packet based protocol is a version of at least one member of the group consisting of at least one internet related protocol, a Universal Serial Bus (USB) protocol, a Secure Digital IO (SDIO) protocol, an Institute for Electronic and Electrical Engineers (IEEE) 1394 (Firewire) protocol, and a MEMORYSTICK™ (MSIO) protocol;

wherein said another communications protocol is a version of a Serial Peripheral Interface (SPI) protocol;

wherein said HTC packet further comprises a HTC trailer;

wherein a HTC null packet includes said HTC payload having said length of at least zero;

wherein said target messaging environment is further configured to respond to a request for a report for credits by sending said HTC packet with said HTC trailer including a credit report.

8. The target apparatus of claim 7, wherein said target messaging environment is further configured to respond to said request for said report for said credits by sending said HTC null packet with said HTC trailer including said credit report.

9. The target apparatus of claim 5, wherein said host system includes at least one member of the group consisting of: a router, a wireless network server, a wireless base station, a desktop computer, a gaming computer, a notebook computer, a handheld computer, a wireless telephone, and a personal digital assistant;

wherein said target apparatus includes at least one member of the group consisting of: a Universal Serial Bus (USB) device, a Firewire device, a disk drive, a removable memory device, a security identification device, a gaming device, a camera, a media player, and a headset;

wherein said target processor includes at least one instance of at least one member of the group consisting of a finite state machine and a computer accessibly coupled to a computer readable memory, said computer readable memory including a program system, with said program system for said target processor at least partly supporting said target messaging environment to implement said HTC protocol.

10. The target apparatus of claim 9, further comprising said computer readable memory configured to be accessibly coupled to said computer and/or a download server;
  wherein said computer readable memory includes at least one of said program system for said target processor at least partly supporting said messaging environment to implement said HTC protocol; and/or
  an installation package to generate said program system for said target processor; and
  wherein said download server provides at least one member of a group consisting of:
  said installation package; and
  said program system for said target processor.

11. A host system, comprising:
  a Wireless Local Area Network (WLAN) interface;
  a host point-to-point interface for communicating via a point-to-point coupling with a target using a point-to-point communications protocol;
  a host processor coupled with said host point-to-point interface and coupled with said WLAN interface, wherein said host system is configured to provide services of said WLAN interface by communicating via said point-to-point coupling with said target lacking said WLAN interface, wherein said target is configured to use said services of said WLAN interface by communicating via said point-to-point coupling; and
  memory in electronic communication with said host processor,
  wherein the memory stores instructions that when executed by said host processor cause said host processor to support a host messaging environment for communicating with a target messaging environment supported by said target, said host messaging environment providing a host manager for a Host Target Communications (HTC) protocol, said HTC protocol sharing a Wireless Module Interface (WMI) with said target for using said WLAN interface, said HTC protocol sharing services of said WMI by use of endpoints identifying said services, wherein said host manager manages at least two buffer resources on said target for said services,
  wherein said host messaging environment provides a module of said HTC protocol, said services of said WMI by use of said endpoints, and said buffer resources for said services as managed by said host manager.

12. The host system of claim 11,
  wherein said point-to-point communications protocol comprises at least one member of the group consisting of a serial packet based protocol and another communications protocol when implemented with packet passing;
  wherein said host manager comprises a host endpoint multiplexor-demultiplexor distributing messages to said WMI services based upon endpoint identifiers in said host messaging environment;
  wherein said module of said HTC protocol comprises a target endpoint multiplexor-demultiplexor distributing said messages to said WMI services based upon endpoint identifiers in said target messaging environment;
  wherein said HTC protocol supports an HTC packet comprising an HTC header and an HTC payload;
  wherein said HTC header comprises an identifier of said endpoint; and
  wherein said HTC payload has a length of at least zero.

13. The host system of claim 12,
  wherein said serial packet based protocol is a version of at least one member of the group consisting of at least one internet related protocol, a Universal Serial Bus (USB) protocol, a Secure Digital IO (SDIO) protocol, an Institute for Electronic and Electrical Engineers (IEEE) 1394 (Firewire) protocol, and a MEMORYSTICK™ (MSIO) protocol;
  wherein said another communications protocol is a version of a Serial Peripheral Interface (SPI) protocol;
  wherein said HTC packet further comprises an HTC trailer;
  wherein an HTC null packet includes said HTC payload having said length of at least zero;
  wherein said target messaging environment is further configured to respond to a request for a report for credits by sending said HTC packet with said HTC trailer including a credit report.

14. The host system of claim 13, wherein said target messaging environment is further configured to respond to said request for said report for said credits by sending said HTC null packet with said HTC trailer including said credit report.

15. The host system of claim 11,
  wherein said host system includes at least one member of the group consisting of: a router, a wireless network server, a wireless base station, a desktop computer, a gaming computer, a notebook computer, a handheld computer, a wireless telephone, and a personal digital assistant;
  wherein said host processor includes at least one instance of at least one member of the group consisting of a finite state machine and a computer accessibly coupled to a computer readable memory, said computer readable memory including a program system, and
  with said program system for said host processor at least partly supporting said host messaging environment to implement said HTC protocol.

16. The host system of claim 15, further comprising said computer readable memory configured to be accessibly coupled to said computer and/or a download server;
  wherein said computer readable memory includes at least one of said program system for said host processor at least partly supporting said host messaging environment to implement said HTC protocol; and/or
  an installation package to generate said program system for said host processor; and
  wherein said download server provides at least one member of a group consisting of:
  said installation package; and
  said program system for said host processor.

17. A method, comprising the step of:
  receiving at a host system a packet from a target;
  with said packet including a data payload and a trailer;
  wherein said trailer pads a length of said packet to a predetermined length and said trailer includes state information; and
  wherein said host system is point-to-point coupled with said target using a point-to-point communications protocol;
  wherein said state information includes at least one of a credit report of a messaging environment of said target, said credit report including an available buffer count for at least one service of a Wireless Module Interface (WMI), and a look-ahead record, said look-ahead record including at least a packet length of a next packet to be sent to said host system by said target;
  wherein said point-to-point communications protocol comprises at least one member of the group consisting of a serial packet based protocol and another communications protocol when implemented with packet passing;
  wherein said serial packet based protocol is a version of at least one member of the group consisting of at least one internet related protocol, a Universal Serial Bus (USB) protocol, a Secure Digital IO (SDIO) protocol, an Institute for Electronic and Electrical Engineers (IEEE) 1394 (Firewire) protocol and a MEMORYSTICK™ (MSIO) protocol; and wherein said another communications protocol is a version of a Serial Peripheral Interface (SPI) protocol.

\* \* \* \* \*